Figures 1, 2:
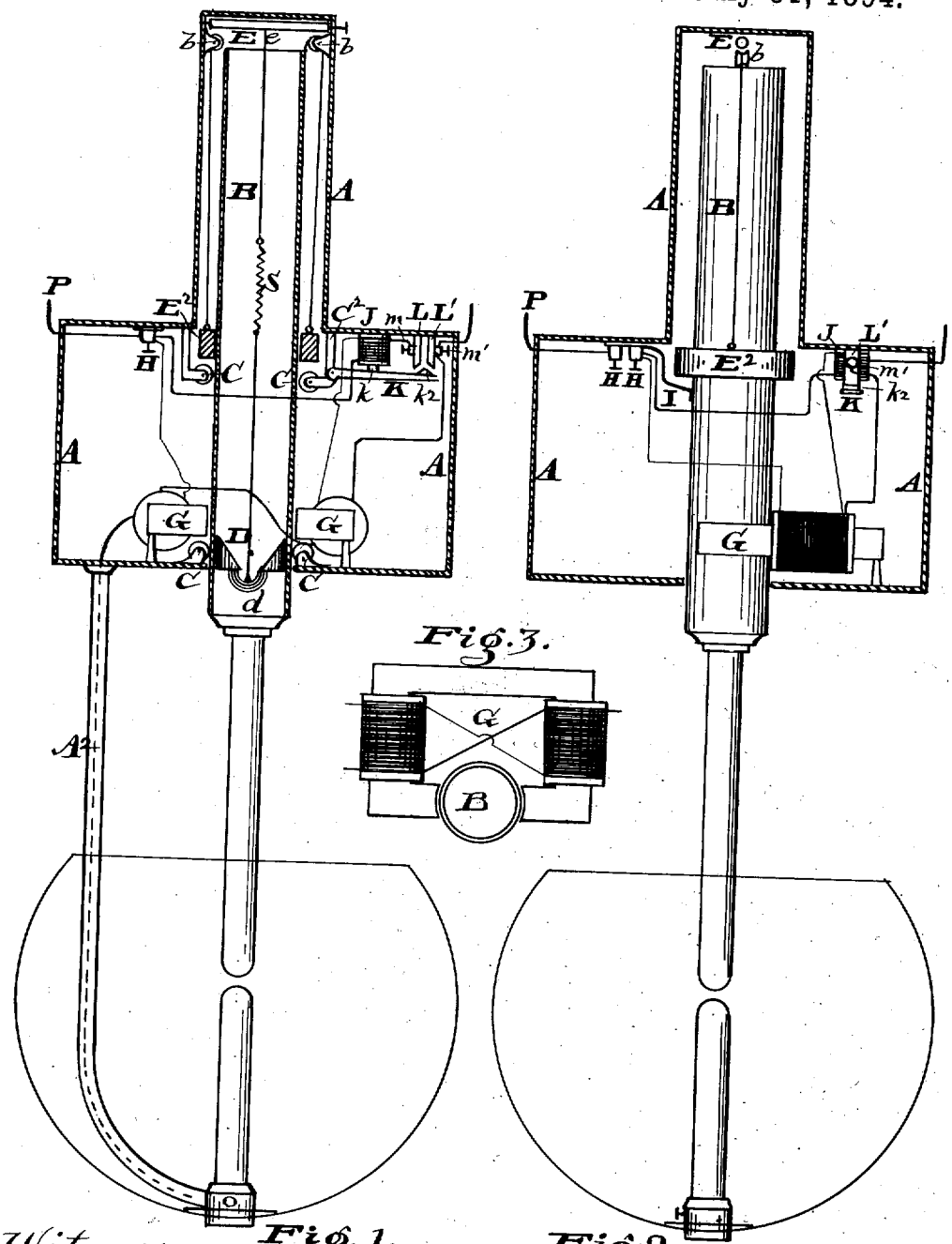

J. B. McKEOWN.

ELECTRIC ARC LAMP.

No. 11,433. Reissued July 31, 1894.

Witnesses,

S. S. Stewart

Geo. B. Tibbitts

Inventor,

Joseph B. McKeown, by Geo. W. Tibbitts, Atty.

UNITED STATES PATENT OFFICE.

JOSEPH B. MCKEOWN, OF CLEVELAND, OHIO.

ELECTRIC-ARC LAMP.

SPECIFICATION forming part of Reissued Letters Patent No. 11,433, dated July 31, 1894.

Original No. 519,045, dated May 1, 1894. Application for reissue filed May 22, 1894. Serial No. 512,137.

*To all whom it may concern:*

Be it known that I, JOSEPH B. MCKEOWN, a subject of the Queen of Great Britain, residing at Cleveland, county of Cuyahoga, and State of Ohio, have invented certain new and useful Improvements in Electric-Arc Lamps, of which the following is a specification.

This invention relates to electric arc-lamps and consists in the new construction and combination, substantially as hereinafter described and pointed out in the claims.

In the accompanying drawings:—Figure 1 is a vertical section of my new arc-lamp, showing the construction and method of operation of the several parts. Fig. 2 is a transverse vertical section of the same. Fig. 3 is a detached view of the electro-magnet which controls the feed of the carbons.

The invention relates especially to the mechanism for feeding and controlling the carbon rod, and has for its object to provide a simple and efficient means of construction.

Referring to the drawings A represents a casing and center chimney for containing and supporting the working mechanism.

B is a carbon rod, consisting of a tube open at its upper end and suspended in the chimney by means of cords attached to its top and running over pulleys *b b* secured in the top of the chimney and passing down on the outside of said tube and connected with a counterbalance weight ring $E^2$, surrounding said tube.

C C are guide wheels bearing against the sides of the tube B, attached by suitable means to the top and bottom of the casing A, for the purpose of accurately holding and guiding the tube in its vertical movements. To the lower end of said rod is attached the upper carbon in the usual manner. The lower carbon being held by the suspension rod $A^2$, which also supports the globe.

D is a gripping armature consisting of two wedge shaped pieces united at their bases by hinge or flexible wires *d*, and the armature is held suspended in place by a central rod or wire F attached at its top end to a cord *e*, wound on a cross-shaft E, journaled in the top of the chimney, having a knob on the outside of the chimney by means of which the shaft may be turned, for the purpose of adjusting the armature to position. The rod F is divided at its middle part and a spring S is interposed between said parts for the purpose of giving elasticity to the rod F.

G is an electro-magnet supported on the floor of casing A, having its poles in close proximity to the sides of the tube B, and on a level approximately opposite to the poles of the armature D, and is employed for attracting the armature against the inside of the tube for gripping the tube and raising it for opening the voltaic arc.

H H are binding posts attached to the top of the casing at one side of the tube.

I is a copper strip attached to the posts, having its lower end bearing against the side of the tube B, for conveying a current of electricity to said tube. The cut-out consists of a solenoid J attached to top of casing, and a lever K pivotally attached to the hanger $C^2$ having an armature *k* under the solenoid.

L L′ are two short bars depending from the casing A by the side of the solenoid, having their lower inside corners beveled, so as to form jaws. On the end of lever K is made a cone-shaped projection $k^2$, which comes in contact with the bevel of said jaws when it is lifted by the solenoid.

A coarse and fine wire are used in this lamp arranged and wound in the manner as follows: The coarse wire P leading to the binding post H, the current goes thence through the copper strip I and carbon rod B, thence down through the carbons, thence by wire up in the suspension rod $A^2$, thence to the helices of the electro-magnet G, and thence to binding post *m′*. A fine wire is also provided running from binding post H to the helices on electro-magnet G and is wound on them in the opposite direction to the coarse wire, and runs thence to the solenoid and terminates at the binding post *m′*. A short circuit wire N leads direct from post H to the solenoid.

The working of this lamp is as follows:—The current travels the coarse wire around the core of the magnet G and the magnet attracts the armature D to the sides of tube B, and as the lines of magnetism will always try to straighten or shorten themselves, this same course will draw the armature up to complete the magnetic circuit, this same force which attracts the armature D causes said armature to spread in the tube with sufficient power to grip, raise and hold the tube B to open the arc. The fine wire being in shunt with the arc, will result in decreasing the strength of the magnet and release the grip of the armature, so as to allow the rod to feed the arc. The cut-out consisting of solenoid wound with both fine and coarse wire in the same direction, the fine wire being in series with the fine wire on the magnet G, and the whole being in shunt with the arc is so proportioned and adjusted that when the arc increases in voltage the solenoid will attract and pull up the armature $k$, or lever K until the projection $k^2$ makes contact with the jaws L, L′, thus cutting out or short circuiting the current away from the carbons.

Having described my invention, I claim—

1. In an electric arc-lamp, the combination of a casing and chimney A, a tubular carbon rod B located in said chimney, a copper strip I attached to binding post H and bearing against said tube B, for conveying current to said tube; an electro-magnet G having its poles in close proximity to the outside of tube B, and connected in the electric circuit by coarse and fine wires wound in opposite directions; the double wedge-shaped armature D, suspended in the tube B by a rod F, and having its poles approximately opposite to the poles of the electro-magnet, and adapted to operate substantially as described.

2. In an electric arc-lamp the combination of a tubular rod B, suspended in the chimney by cords attached to the top end and passing over pulleys $b$, $b$, in top of chimney; a counterbalance weight ring $E^2$ attached to the opposite ends of said cords; guide wheels C, C, secured in the casing A; armature D suspended inside of said tube B, and the electro-magnet G outside of the tube and connected in the electric circuit, and adapted to operate substantially as described.

3. In an electric arc-lamp the combination of a tubular carbon rod B suspended in the chimney by cords attached to its top end and passing over pulleys $b$, $b$, in the top of the chimney; a counter-balance weight E′ attached to the opposite ends of said cords; guide wheels C, C, secured in the casing A; armature D suspended inside of said tube B; the electro-magnet G. outside of tube B and connected in the electric circuit; a solenoid J connected in the series by fine wire and by shunt circuit to coarse wire, a lever K pivoted under the solenoid, having armature $k$, bars L, L′, having binding posts $m$, $m'$, all constructed to operate substantially as and for the purpose set forth.

JOSEPH B. McKEOWN.

Witnesses:
GEO. W. TIBBITTS,
M. G. NORTON.